(12) United States Patent
Werjefelt et al.

(10) Patent No.: US 9,914,546 B2
(45) Date of Patent: Mar. 13, 2018

(54) ELECTRO-OPTICAL EMERGENCY VISION APPARATUS

(76) Inventors: Bertil R. L. Werjefelt, Kaneohe, HI (US); David Jenkins, Loomis, CA (US)

( * ) Notice: Subject to any disclaimer, the term of this patent is extended or adjusted under 35 U.S.C. 154(b) by 1195 days.

(21) Appl. No.: 12/232,058

(22) Filed: Sep. 10, 2008

(65) Prior Publication Data

US 2011/0001796 A1    Jan. 6, 2011

Related U.S. Application Data (60) Provisional application No. 61/008,590, filed on Dec. 21, 2007, provisional application No. 61/006,504, filed on Jan. 17, 2008.

(51) Int. Cl.
| | |
|---|---|
| *H04N 13/02* | (2006.01) |
| *G02B 27/02* | (2006.01) |
| *G02B 27/04* | (2006.01) |
| *B64D 43/00* | (2006.01) |
| *G02B 27/01* | (2006.01) |
| *G02B 6/00* | (2006.01) |

(52) U.S. Cl.
CPC .......... *B64D 43/00* (2013.01); *G02B 27/017* (2013.01); *G02B 6/00* (2013.01); *G02B 2027/0138* (2013.01); *G02B 2027/0167* (2013.01); *G09G 2380/12* (2013.01)

(58) Field of Classification Search
CPC .............. G02B 27/017; G02B 2027/01; G02B 2027/017; G02B 2027/0141; G02B 2027/0167; G02B 6/00; G02B 2027/0138; B64D 43/00; B64D 25/00; G09G 2380/12
USPC ................. 348/47; 244/118.5; 359/630–632; 345/7, 8; 340/980, 971, 945; 701/14; 2/6.1–6.5

See application file for complete search history.

(56) References Cited

U.S. PATENT DOCUMENTS

| | | |
|---|---|---|
| 2,256,133 A | 9/1941 | Barnes |
| 2,730,921 A | 1/1956 | Little |
| 3,205,303 A | 9/1965 | Bradley |
| 3,216,778 A | 11/1965 | Davies et al. |
| 3,495,517 A | 2/1970 | Sweet |
| 3,744,874 A | 7/1973 | McCarthy et al. |
| 3,804,527 A | 4/1974 | Baughn et al. |

(Continued)

FOREIGN PATENT DOCUMENTS

| | | |
|---|---|---|
| EP | 1 121 959 A1 | 8/2001 |
| WO | WO 99 43242 A1 | 9/1999 |

(Continued)

*Primary Examiner* — Kenneth R Coulter
(74) *Attorney, Agent, or Firm* — Shlesinger, Arkwright & Garvey LLP (57) ABSTRACT

An emergency vision apparatus for providing an operator visual access to information during a smoke emergency, comprises an enclosure made of airtight material having spaced apart front and rear panels, the front panel being transparent, the front panel including fasteners for attachment to an instrument panel; an image capture device attached to said rear panel, the image capture device being oriented to view the instrument panel through the transparent front panel; an image viewing device for being disposed in front of one of the operator's eyes, the image viewing device being operably associated with the image capture device; and a support structure to support said viewing lens in front of one of the operator's eyes.

31 Claims, 7 Drawing Sheets

(56) References Cited

U.S. PATENT DOCUMENTS

| | | |
|---|---|---|
| 3,808,621 A | 5/1974 | French |
| 3,838,343 A | 9/1974 | Hughes et al. |
| 3,838,434 A | 9/1974 | Hughes et al. |
| 3,916,094 A | 10/1975 | Marrone |
| 3,945,716 A | 3/1976 | Kinder |
| 3,990,778 A | 11/1976 | Magee et al. |
| 4,015,115 A | 3/1977 | Corcoran |
| 4,261,204 A | 4/1981 | Donaldson |
| 4,310,849 A | 1/1982 | Glass |
| 4,330,169 A | 5/1982 | Kantor |
| 4,465,347 A | 8/1984 | Task et al. |
| RE32,213 E | 7/1986 | Brown |
| 4,832,287 A | 3/1989 | Werjefelt |
| 4,863,130 A | 9/1989 | Marks, Jr. |
| 4,878,046 A | 10/1989 | Smith |
| 5,113,177 A | 1/1992 | Cohen |
| 5,140,351 A | 8/1992 | Garcia et al. |
| 5,202,796 A | 4/1993 | Werjefelt |
| 5,246,193 A | 9/1993 | Faidley |
| 5,420,828 A | 5/1995 | Geiger |
| 5,602,948 A | 2/1997 | Currie |
| 5,947,415 A | 9/1999 | Werjefelt |
| 6,082,673 A | 5/2000 | Werjefelt |
| 6,297,749 B1 | 10/2001 | Smith |
| 6,460,804 B2 | 10/2002 | Werjefelt |
| 6,567,220 B2 | 5/2003 | McDonald et al. |
| 6,675,800 B2 | 1/2004 | Keller |
| 6,710,298 B2 | 3/2004 | Eriksson |
| 6,714,141 B2 | 3/2004 | Kennedy |
| 7,170,476 B2 | 2/2007 | Guell et al. |
| 8,888,042 B2 * | 11/2014 | Werjefelt ............... B64D 43/00 244/118.5 |
| 9,193,477 B2 * | 11/2015 | Werjefelt ............... B64D 25/00 |
| 9,329,393 B2 * | 5/2016 | Werjefelt ............... G02B 27/04 |
| 9,567,103 B2 * | 2/2017 | Werjefelt ............... B64D 25/00 |
| 2001/0010225 A1 * | 8/2001 | Keller ..................... 128/201.25 |
| 2003/0002164 A1 * | 1/2003 | McDonald et al. .......... 359/630 |
| 2003/0201911 A1 * | 10/2003 | Kennedy ..................... 340/980 |
| 2005/0117052 A1 | 6/2005 | Willes |
| 2006/0145003 A1 | 7/2006 | Bardel et al. |
| 2006/0209441 A1 | 9/2006 | Werjefelt |
| 2009/0279196 A1 * | 11/2009 | Werjefelt ..................... 359/894 |

FOREIGN PATENT DOCUMENTS

| | | |
|---|---|---|
| WO | WO 00 28281 A1 | 5/2000 |
| WO | WO 2009/082480 A1 | 7/2009 |

* cited by examiner

ELECTRO-OPTICAL EMERGENCY VISION APPARATUS

RELATED APPLICATIONS

This application claims the benefit of provisional application Ser. Nos. 61/008,590 filed Dec. 21, 2007, and 61/006,504, filed Jan. 17, 2008, both of which are hereby incorporated by reference.

FIELD OF THE INVENTION

The present invention is generally directed to an apparatus to enable an operator to maintain visual contact with instruments or other visual sources of data after smoke and/or particulate from a fire or other sources has invaded the operator's environment. In particular, the present invention relates to a system that provides a clear view outside the windshield and of the instrument panel, relevant checklist, approach plate, keyboard, circuit breakers, fuses, control panel, etc., thereby providing a pilot with vital information for guiding the aircraft to a safe landing after smoke and/or particulate matter invades the cockpit area.

BACKGROUND OF THE INVENTION

When cockpits are invaded by continuous, dense, blinding smoke that turn airplanes into unguided missiles, the results are well known to be catastrophic and fatal for passengers and crew. None create an unsafe condition faster than a pilot blinded by continuous, opaque smoke. And none occur as frequently as smoke in the cockpit. According to the Air Line Pilots Association, airliners make an unscheduled or emergency landing due to smoke in the cockpit on an average of once per day.

What is true for a cockpit is equally true for any operator station where the operator's ability to see the instrument panel when smoke invades the operator's station depends on the safe operation or orderly shutdown of critical processes, such as occur in a nuclear power station, submarine and similar operator stations.

The present invention is related to U.S. Pat. Nos. 4,832,287; 5,318,250; 5,202,796; 5,947,415; and 6,082,673.

Prior art emergency vision assurance systems use inflatable enclosures with viewing panels at opposite ends of the enclosures to gap the distance between the pilot's face mask and the windshield or the instrument panel to allow the pilot access to visual information to help him operate an aircraft in the event of smoke in the cockpit.

SUMMARY OF THE INVENTION

The present invention provides an emergency vision apparatus for providing an aircraft pilot in a cockpit visual access to information during a smoke emergency, comprising a first objective lens for being operably attached to a cockpit windshield, the objective lens being oriented to view objects outside the cockpit; a first viewing lens for viewing objects encompassed by the first objective lens; a first optic fiber having one end operably associated with the first lens and an opposite end being operably associated with the first viewing lens for transmitting light from the first lens to the first viewing lens; an enclosure made of airtight material having spaced apart front and rear panels, the front panel being transparent, the front panel including fasteners for attachment to an instrument panel; a second objective lens attached to the rear panel, the second lens being oriented to view the instrument panel through the transparent front panel; a second viewing lens for viewing the instrument panel encompassed by the second objective lens; a second optic fiber having one end operably associated with the second lens and an opposite end being operably associated with the second viewing lens for transmitting light from the second lens to the second viewing lens; and a support structure to support the first and second viewing lens in front of one of the pilot's eyes.

The present invention further provides an emergency vision apparatus for providing an aircraft pilot in a cockpit visual access to information during a smoke emergency, comprising a first camera for being operably attached to a cockpit windshield, the first camera being oriented to view objects outside the cockpit; a first display for displaying images generated by the first camera; a first wire having one end operably associated with the first camera and an opposite end being operably associated with the first display for transmitting video signals from the first camera to the first display; an enclosure made of airtight material having spaced apart front and rear panels, the front panel being transparent, the front panel including fasteners for attachment to an instrument panel; a second camera attached to the rear panel, the second camera being oriented to view the instrument panel through the transparent front panel; a second display for displaying images generated by the second camera; a second wire having one end operably associated with the second camera and an opposite end being operably associated with the second display for transmitting video signals from the second camera to the second display; and a support structure for positioning the first and second displays in front of one of a pilot's eyes.

The present invention further provides an emergency vision apparatus for providing an aircraft pilot in a cockpit visual access to information during a smoke emergency, comprising a first camera for being operably attached to a cockpit windshield, the first camera being oriented to view objects outside the cockpit, the first camera including a first transmitter for transmitting video signals from the first camera; a first display for displaying images generated by the first camera; an enclosure made of airtight material having spaced apart front and rear panels, the front panel being transparent, the front panel including fasteners for attachment to an instrument panel; a second camera attached to the rear panel, the second camera being oriented to view the instrument panel through the transparent front panel, the first camera including a second transmitter for transmitting video signals from the second camera; a second display for displaying images generated by the second camera; a receiver for receiving video signals from the first and second cameras; and a support structure for positioning the first and second displays in front of one of a pilot's eyes.

The present invention also provides an electro-optical emergency vision apparatus for providing an aircraft pilot in a cockpit visual access to information during a smoke emergency, comprising a computer operably connected to an aircraft avionics systems for receiving flight data to be displayed; an image processor for processing data from the computer suitable for display; a first camera for being operably attached to a cockpit windshield, the first camera being oriented to view objects outside the cockpit and operably connected to the image processor; an enclosure made of airtight material having spaced apart front and rear panels, the front panel being transparent, the front panel including fasteners for attachment to an instrument panel; a second camera attached to the rear panel and oriented to view the instrument panel through the transparent front panel, the second camera being operably attached to the image processor; and a display for displaying data from the computer and the first and second cameras.

The present invention further provides an emergency vision apparatus for providing an operator visual access to information during a smoke emergency, comprising an enclosure made of airtight material having spaced apart front and rear panels, the front panel being transparent, and the front panel including fasteners for attachment to an instrument panel; an image capture device attached to said rear panel, the image capture device being oriented to view the instrument panel through the transparent front panel; an image viewing device for being disposed in front of one of the operator's eyes, the image viewing device being operably associated with the image capture device; and a support structure to support the viewing lens in front of one of the operator's eyes.

DETAILED DESCRIPTION OF THE INVENTION

Figure 1:
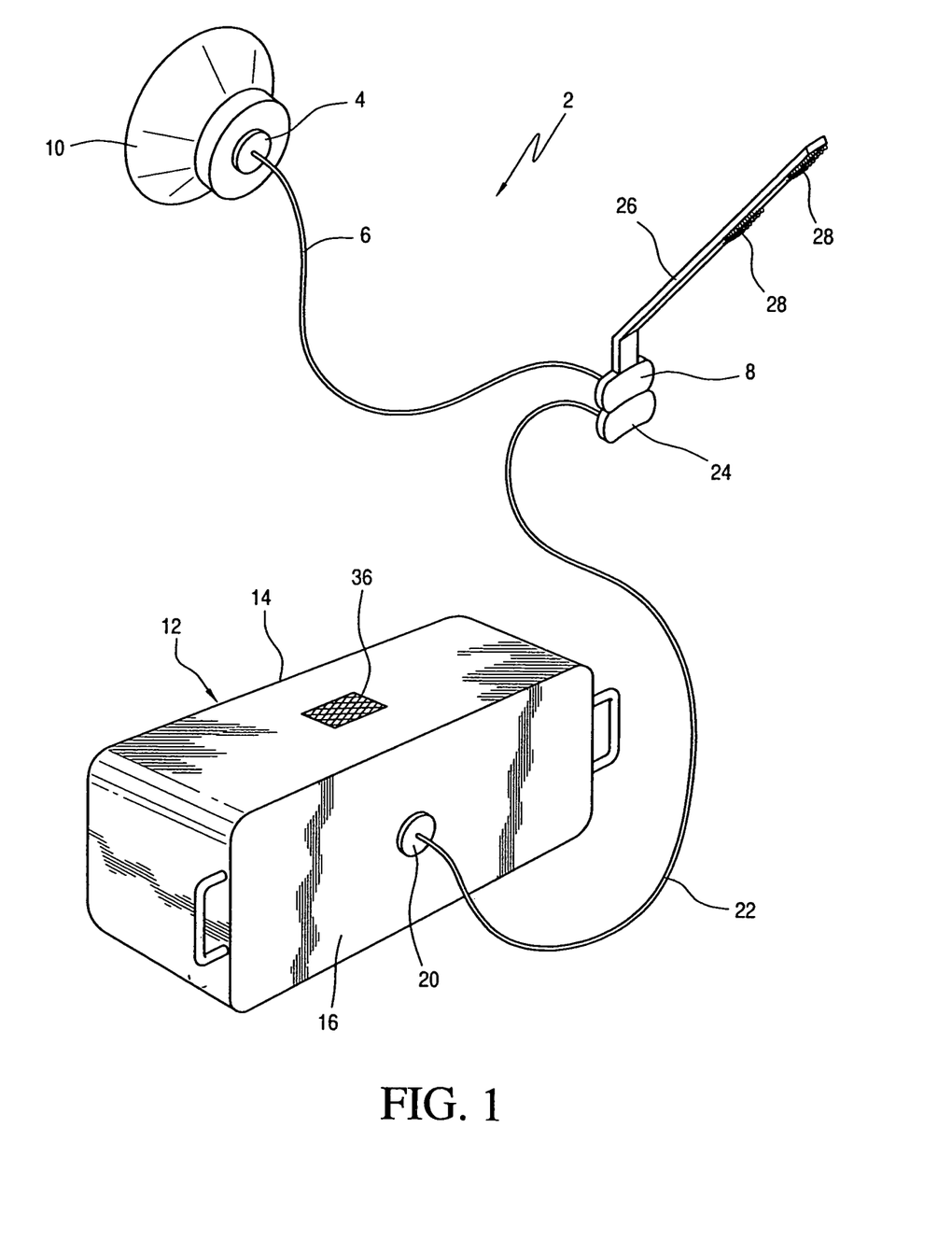
FIG. 1 is a perspective view of an emergency vision apparatus for allowing a pilot to see through the windshield and at the instrument panel of the aircraft during a smoke emergency.

Referring to FIG. 1, an emergency vision apparatus 2 comprises an objective lens 4 connected to an optic fiber 6 and a viewing lens 8 connected to the other end of the optic fiber 6. The lens 4 is mounted in a suction cup 10 for attachment to the windshield of an aircraft cockpit. The apparatus 2 also includes an expandable box or enclosure 12 with transparent front panel 14 rear panel 16. The enclosure 12 is made of airtight material. Fasteners 18, such as VELCRO strips, are provided along the front outer edge of the enclosure 12 for attachment to the instrument panel of the cockpit. An objective lens 20 is secured to the rear panel 16 of the enclosure 12. An optic fiber 22 connects the lens 20 to a viewing lens 24. A support arm 26 with fasteners 28 is used to support the lenses 8 and 24 in front of the pilot's eye. The fasteners 28 are used to secure the support arm 26 to the pilot's oxygen helmet.

Figure 2:
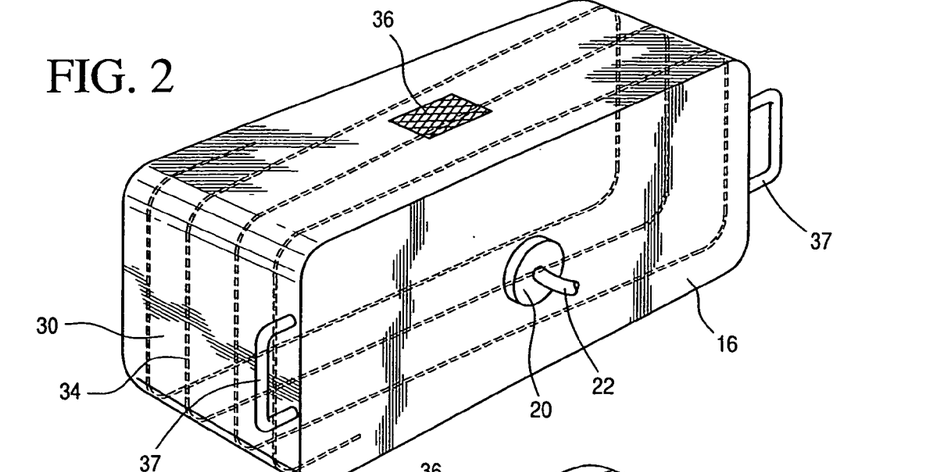
FIG. 2 is a rear perspective view of a collapsible enclosure used in the apparatus of FIG. 1, shown in an expanded and deployed configuration for viewing the instrument panel.
Figures 3, 4:
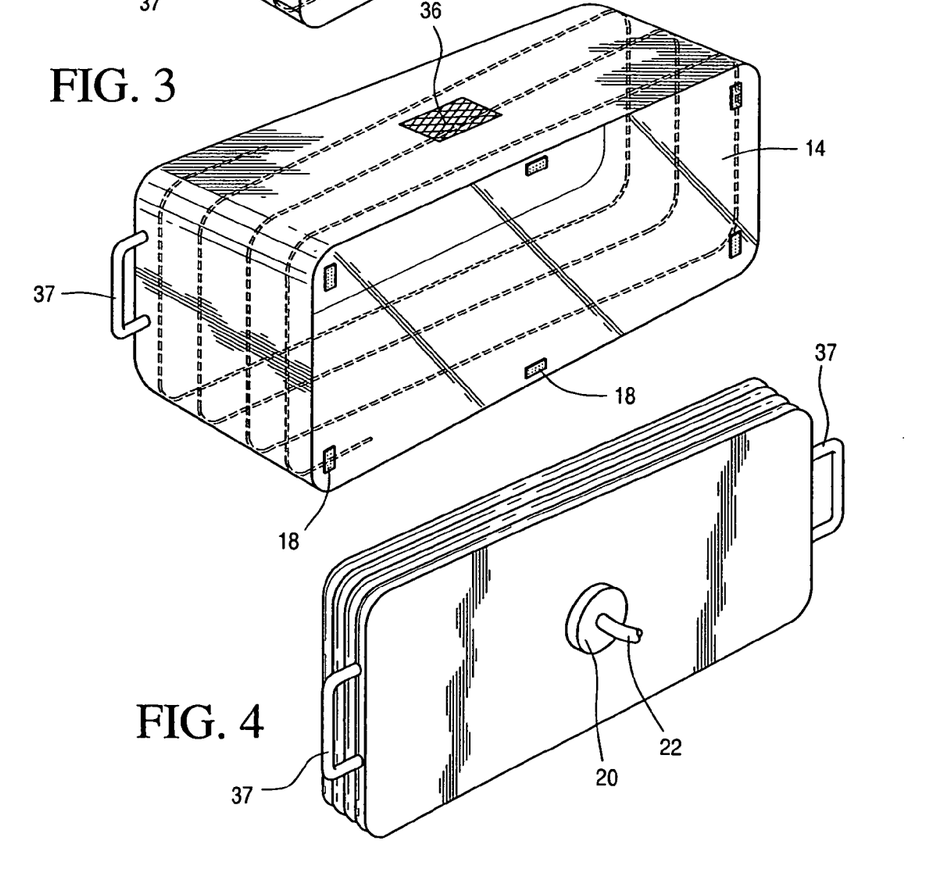
FIG. 3 is a front perspective of the collapsible enclosure of FIG. 2.
FIG. 4 is a rear perspective view of the enclosure of FIG. 2, shown in a deflated configuration for stowage.
Figure 8:
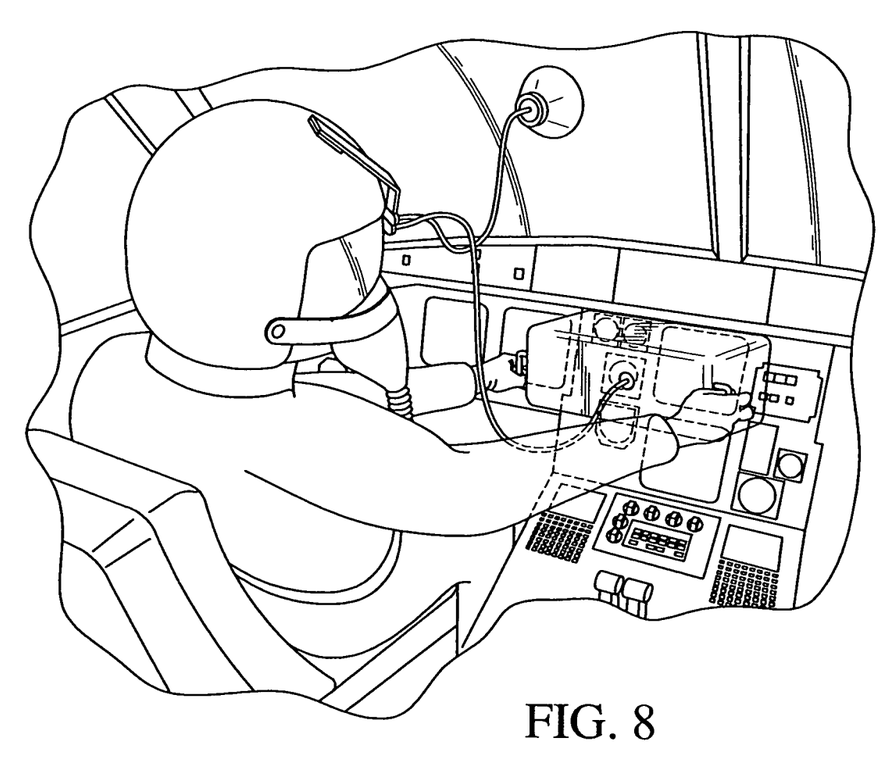
FIG. 8 is similar to FIG. 5, showing the pilot moving the enclosure to a different position on the instrument panel.
Figure 9:
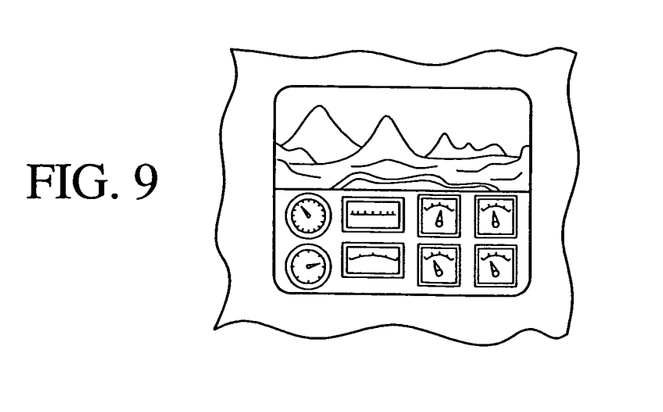
FIG. 9 is a schematic view of images as seen through the windshield and the enclosure.

Referring to FIGS. 2, 3 and 4, the enclosure 12 includes pliable sidewall 30 supported by a coil spring 34. The sidewall 30 encloses the front and rear panels 14 and 16 to provide a sealed interior volume. The spring 34 allows the enclosure 12 to be compressed and deflated to a compact configuration when not in use, as shown in FIG. 4. The spring 34 is biased to force the enclosure 12 into the expanded position as shown in FIGS. 2 and 3. When the enclosure 12 is allowed to expand, air from the cockpit is drawn through a filter 36, thereby filling the interior volume of the enclosure 12 with clear air. The filter 36 is designed to filter smoke or other particulate matter in the air to provide clear air within the enclosure 12. The enclosure 12 includes handle straps 37 to allow the pilot to conveniently move the enclosure 12 to different portions of the instrument panel as needed (see FIGS. 5 and 8). The attachment patches 18 are used to secure the enclosure 12 to the instrument panel. The transparent front panel 14 is made of pliable material to allow it to conform to the irregularities on the front face of the instrument panel.

Figure 5:
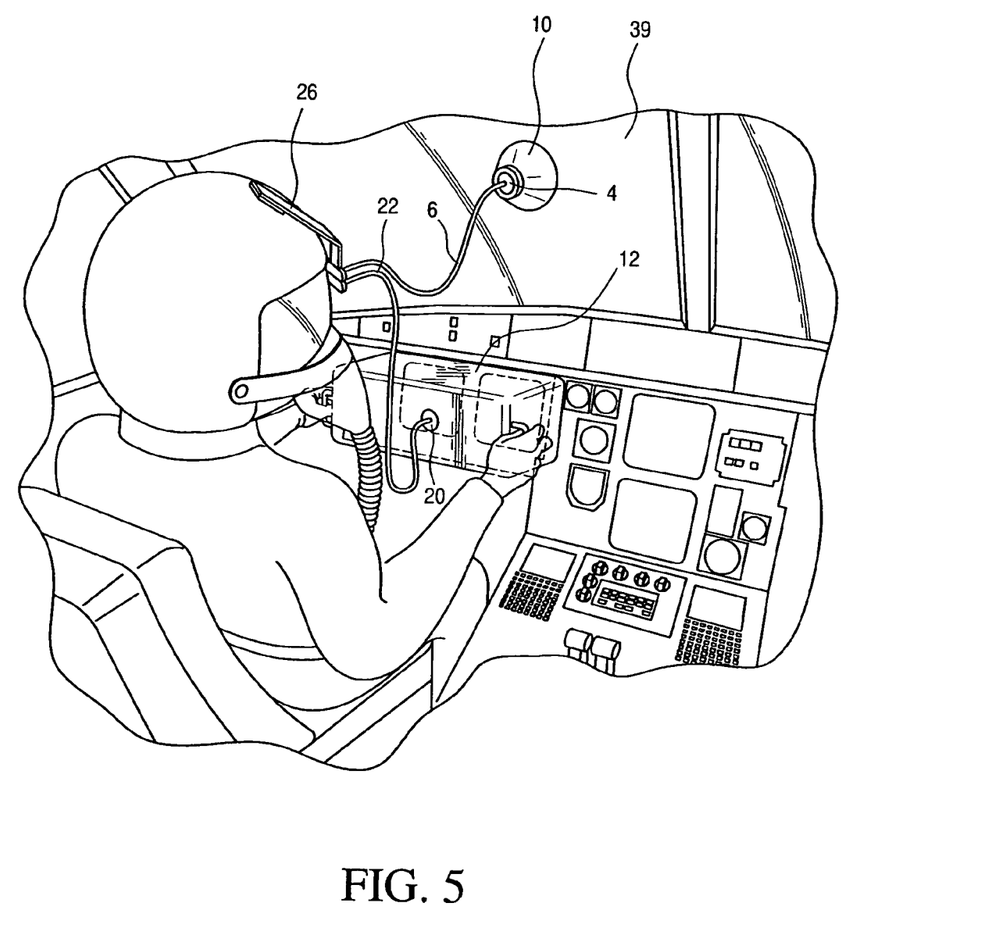
FIG. 5 is a rear perspective view of the an aircraft cockpit, showing the present invention in use by a pilot.

Referring to FIG. 5, the apparatus 2 is used during a smoke emergency in an aircraft cockpit to provide the pilot access to essential visual information for the operation and landing of the aircraft, such as a clear view outside the windshield, the instrument panel, relevant checklist, approach plate, keyboard, circuit breakers, fuses, control panel, etc. The suction cup 10 is attached to the windshield 39 to position the lens 4 to view objects outside the windshield. The lens 4 has a field of view wide enough to give the pilot a sufficient view of the outside. The support arm 26 is attached to the helmet to closely position the lenses 8 and 24 in front of one of the pilot's eyes, such as the right eye as shown. The enclosure 12 is released from its stowage, allowing the spring 32 to expand the enclosure 12. Air from the cockpit is drawn through the filter 36 to fill the interior of the enclosure 12 with clear air. The enclosure 12 is positioned over and against a desired portion of the instrument panel, thereby displacing smoke between the front panel 14 and the face of the instrument panel. The lens 20 is accordingly provided with a clear view of the instrument panel through the interior of the enclosure 12. The fasteners 18 are attached to corresponding fasteners on the instrument panel, allowing the enclosure 12 to be supported from the instrument panel. The lens 20 has a field of view that substantially encompasses the width and height of the enclosure 12. Images picked up by the respective lenses 4 and 20 are transmitted through the respective optic fibers 6 and 22 to the respective viewing lenses 8 and 24 for viewing by the pilot.

Figure 6:
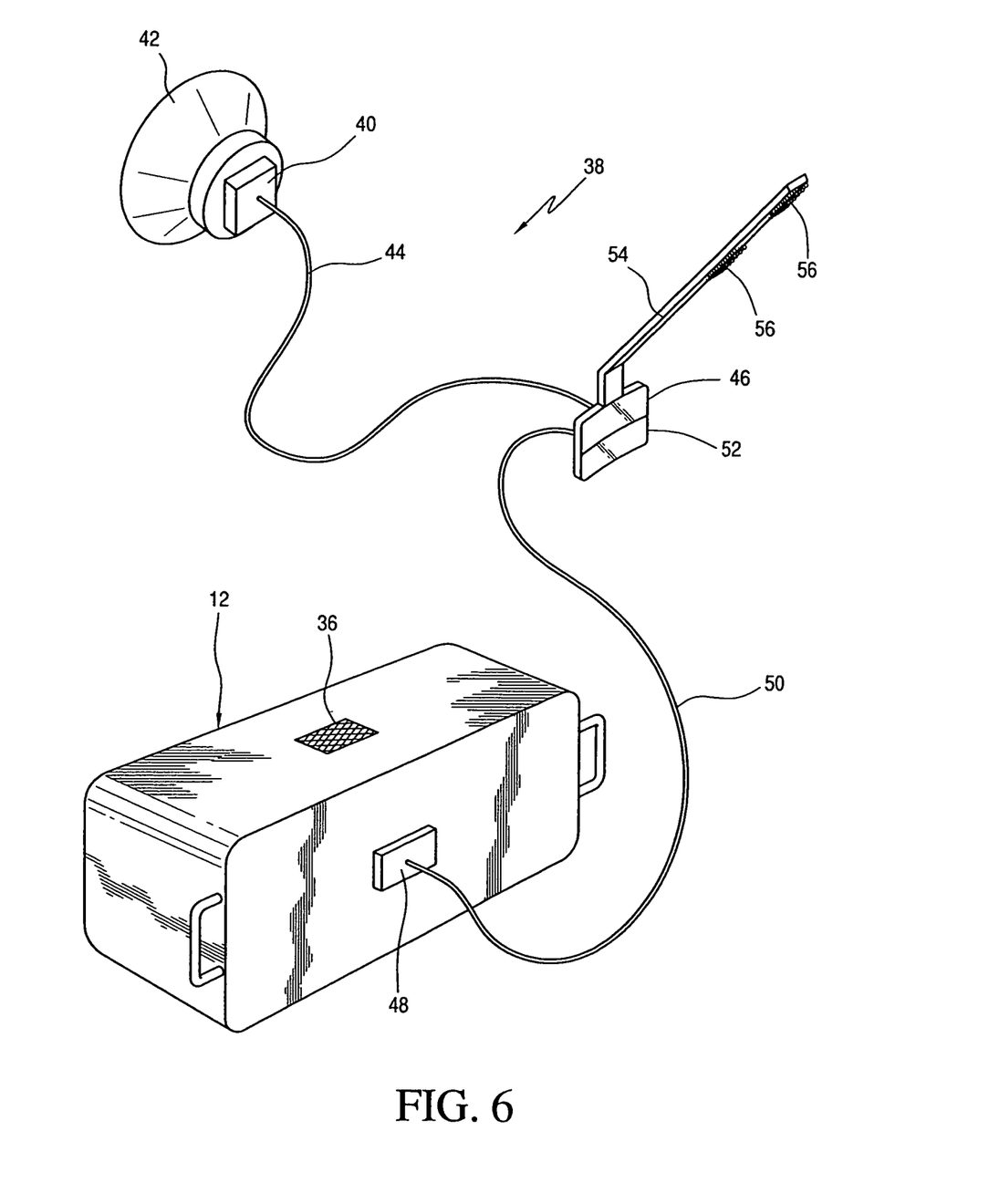
FIG. 6 is a perspective view of another embodiment of the present invention, using hard-wired cameras.

Referring to FIG. 6, another embodiment of an emergency vision apparatus 38 is disclosed. A camera 40 is attached to a suction cup 42. Images seen by the camera 40 are sent via a wire 44 to a LCD display 46. The expandable enclosure 12 is also provided with a camera 48 in place of the lens 20. Images seen by the camera 48 through the front panel 14 are transmitted via a wire 50 to a LCD display 52. Both displays 46 and 52 are supported by a support arm 54 with attachment patches 56 for attachment to the oxygen helmet of the pilot. It should be understood that the LCD displays 46 and 52 may be combined into one display with a split screen comprising an upper and lower screen, where the upper screen is associated with the camera 40 and the lower screen with the camera 48.

In use, the apparatus 38 is used similar to the apparatus 2, during a smoke emergency in an aircraft cockpit to provide the pilot access to essential visual information for the operation and landing of the aircraft. The suction cup 42 is attached to the cockpit windshield 39. The support arm 54 is attached to the pilot's helmet to closely position the displays 46 and 52 in front of one of the pilot's eyes. The enclosure 12 is released from its stowage, allowing the spring 32 to expand the enclosure 12. The front panel 14 of the enclosure 12 is pressed against the face of the instrument panel to displace the smoke obscuring the gauges, dials and displays. Images picked up by the respective cameras 40 and 48 are transmitted via the respective wires 44 and 50 to the respective displays 46 and 52 for viewing by the pilot.

Figure 7:
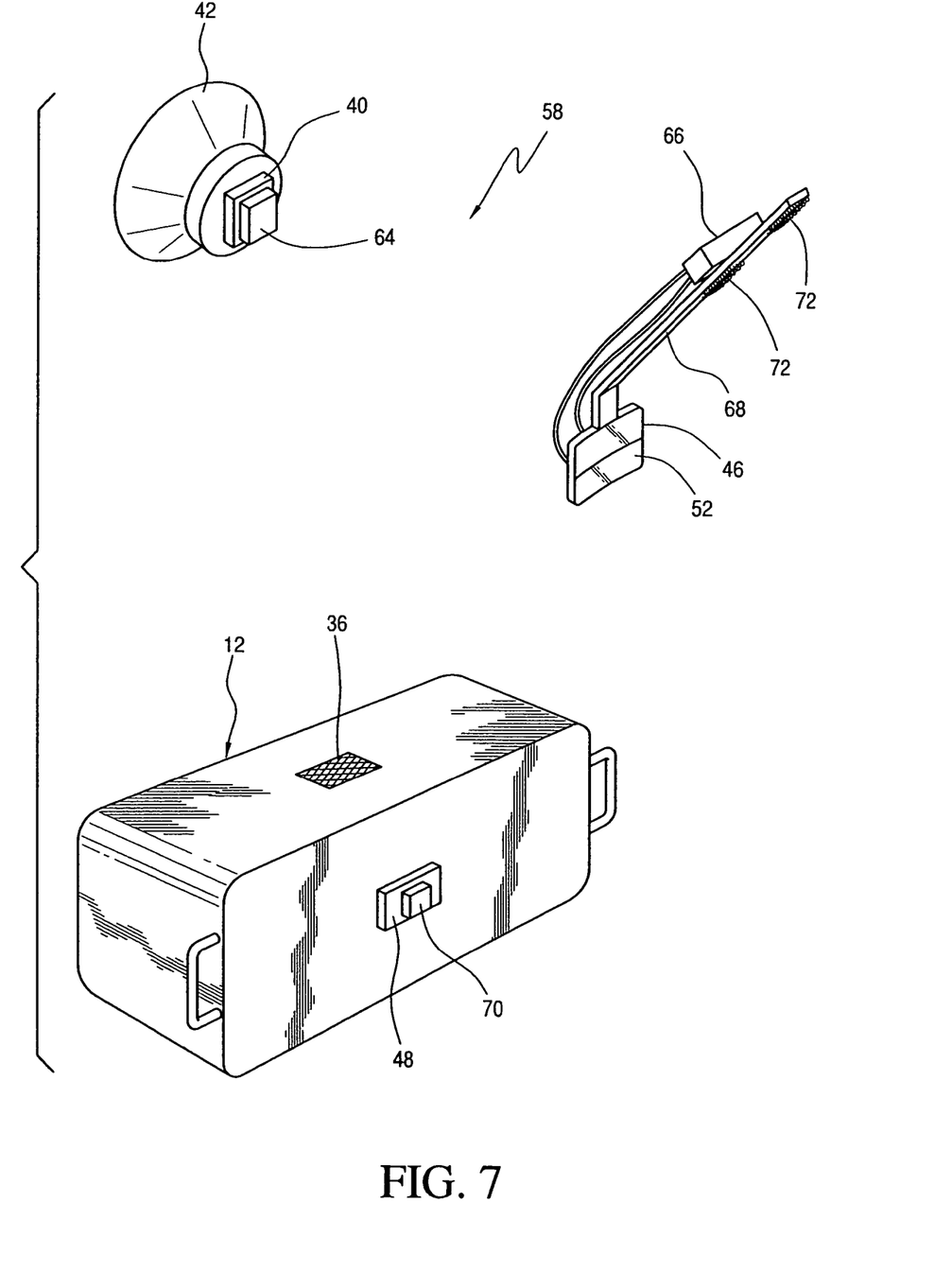
FIG. 7 is a perspective view of another embodiment of the present invention, using wireless cameras and wireless transmission.

Referring to FIG. 7, another embodiment of an emergency vision apparatus 58 comprises the camera 40 attached to the suction cup 42. The camera 40 includes a wireless transmitter 64 for transmitting the images to a receiver 66 attached to a support arm 68. The receiver 66 is operably connected to the LCD display 46 for displaying the images generated by the camera 40. The camera 48 is also provided with a transmitter 70 for transmitting its images to the receiver 66, which is operably connected to the LCD display 52 for displaying the images. The support arm 68 includes fasteners 72 for attachment to the oxygen helmet of the pilot. Operation of the apparatus 58 is similar to the apparatus 38, except that the images generated by the cameras 40 and 48 are transmitted wirelessly to the receiver 66 for viewing on the displays 46 and 52. Standard wireless transmission methods are well known in art.

The support arm 26, 54 or 68 is one way of supporting the lenses 8 and 24, or the displays 46 and 52 for positioning in front of the pilot's right eye. It should be understood that other ways may be provided, such as using an eyeglasses frame. It should be understood that the viewing lenses or displays should be positioned close enough to the helmet visor to minimize obscuring the images by the smoke, or may be positioned inside the pilot's helmet.

Figure 10:
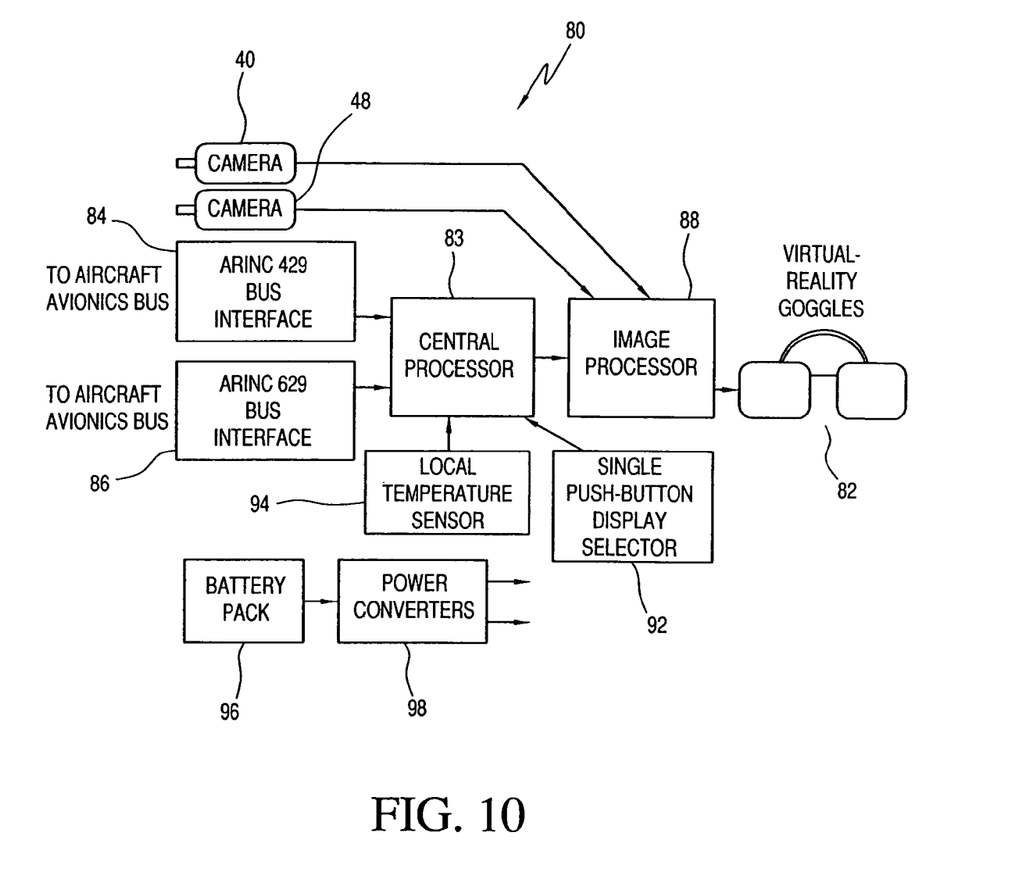
FIG. 10 is a functional block of another embodiment of the present invention, using the aircraft's avionics system to provide flight information delivered to a virtual-reality goggles worn by the pilot.

Referring to FIG. 10, a system 80 for integrating the cameras 40 and 48 with flight information, and displaying the resultant image on display screens integrated in goggles 82 worn by the pilot in case of a smoke emergency is disclosed. The goggles 82 are disclosed as virtual-reality goggles, but other types of displays may be used, such as a monocle-supported display. The camera 40 is focused through the windshield to provide visual information of the flight environment. The camera 48 is focused through the expandable enclosure 12 to view critical cockpit instruments.

A computer 83 is operably connected to the aircraft avionics systems through bus interfaces 84 and 86, such as ARINC 429 and 629, to accommodate older and newer aircrafts. It should be understood that the choice of bus interfaces would depend on the particular bus protocols and is therefore not necessarily limited to ARINC 429 and 629. The computer 83 receives data from the aircraft systems to be displayed, such as the inertial reference systems, flight management system and other flight guidance systems. Connecting to the ARINC bus advantageously allows the imaging system to display selected information from the avionics. Such information may include heading, altitude, GPS and associated topography, and power plant information. Any information on the ARINC bus can be displayed.

The images from the cameras 40 and 48 are fed to an image processor 88 which combines the information provided by the ARINC bus to provide a composite which is displayed on the screens of the virtual-reality goggles 82. A single push-button switch 92, when pressed, allows the pilot to select different image configurations, such as views provided by the cameras 40 and 48 alone, views provided by the avionics system alone, or combinations between the cameras and the avionics system. A temperature sensor 94 provides temperature information in the cockpit. A battery pack 96 and power converters 98 provide the necessary power requirement for the system 80.

The system 80 may be activated by a lanyard, which is pulled when the goggles 82 are removed from the enclosure housing the system 80. A manual switch may also be provided as a backup and for testing the system.

Since the avionics system can also provide GPS topographic information, such as the terrain around an airport and along the flight route, the system 80 is advantageously a highly redundant system, wherein information provided by the camera 40 is also provided by the avionics systems or the information obtained from the ARINC bus is also provided by the camera 48.

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, in FIG. 5, the instrument or control panel may be disposed in an operator station within a control room in a submarine, nuclear power plant, or other critical areas. In this case, to continue to operate, the operator must have visual access to the instrument or control panel in case smoke invades the operator station. Accordingly, the invention described for the cockpit, without the lens or camera for looking outside, would be equally applicable.

The objective lenses 4 and 20, and the cameras 40 and 48 are examples of image capture devices. The viewing lenses 8 and 24, and the displays 46 and 52 are examples of image viewing devices.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention.

We claim:

1. An emergency vision apparatus for providing an aircraft pilot in a cockpit visual access to information during a smoke emergency, comprising:
   a) a first objective lens for being operably associated with a cockpit windshield, said objective lens being oriented to view objects outside the cockpit;
   b) a first viewing lens for viewing objects encompassed by said first objective lens;
   c) a first optic fiber having one end operably associated with said first objective lens and an opposite end being operably associated with said first viewing lens for transmitting light from said first objective lens to said first viewing lens;
   d) an enclosure made of airtight material having spaced apart front and rear panels, said front panel being transparent;
   e) a second objective lens operably associated with said rear panel, said second objective lens being oriented to view an instrument panel through said transparent front panel;
   f) a second viewing lens for viewing the instrument panel encompassed by said second objective lens;

g) a second optic fiber having one end operably associated with said second objective lens and an opposite end being operably associated with said second viewing lens for transmitting light from said second objective lens to said second viewing lens;
h) said first and second viewing lens for being operably disposed in front of a pilot's eye;
i) said enclosure has an expanded form and a compact stowed form; and
j) a filter operably associated with said enclosure to filter the ambient atmosphere and fill the interior of said enclosure with clear air when said enclosure is expanded to its expanded form.

2. An apparatus as in claim 1, and further comprising:
a) a suction cup for attaching to the windshield; and
b) said first objective lens is carried by said suction cup.

3. An apparatus as in claim 1, wherein said enclosure includes a flexible support biased to expand said enclosure to its expanded form and adapted to be collapsible when said enclosure is collapsed to its compact stowed form.

4. An apparatus as in claim 1, wherein said enclosure includes an inlet operably associated with said filter to allow ambient air to fill said enclosure when said enclosure is expanded to its expanded form.

5. An apparatus as in claim 1, wherein said enclosure is movable to selected parts of the instrument panel.

6. An apparatus as in claim 1, and further comprising:
a) support structure including an arm attachable to a pilot's helmet; and
b) said first and second viewing lens are carried by said arm.

7. An emergency vision apparatus for providing an aircraft pilot in a cockpit visual access to information during a smoke emergency, comprising:
a) a first camera for being operably associated with a cockpit windshield, said first camera being oriented to view objects outside the cockpit;
b) a first display for displaying images generated by said first camera;
c) a first wire having one end operably associated with said first camera and an opposite end being operably associated with said first display for transmitting video signals from said first camera to said first display;
d) an enclosure made of airtight material having spaced apart front and rear panels, said front panel being transparent;
e) a second camera operably associated with said rear panel, said second camera being oriented to view an instrument panel through said transparent front panel;
f) a second display for displaying images generated by said second camera;
g) a second wire having one end operably associated with said second camera and an opposite end being operably associated with said second display for transmitting video signals from said second camera to said second display;
h) said first and second displays are for being operably disposed in front of the pilot's eye;
i) said enclosure has an expanded form and a compact stowed form; and
j) a filter operably associated with said enclosure to filter the ambient atmosphere and fill the interior of said enclosure with clear air when said enclosure is expanded to its expanded form.

8. An apparatus as in claim 7, and further comprising:
a) a suction cup for attaching to the windshield; and
b) said first camera is carried by said suction cup.

9. An apparatus as in claim 7, wherein said enclosure includes a flexible support biased to expand said enclosure to its expanded form and adapted to be collapsible when said enclosure is collapsed to its compact stowed form.

10. An apparatus as in claim 7, wherein said enclosure includes an inlet operably associated with said filter to allow ambient air to fill said enclosure when said enclosure is expanded to its expanded form.

11. An apparatus as in claim 7, wherein said enclosure is movable to selected parts of the instrument panel.

12. An apparatus as in claim 7, and further comprising:
a) support structure including an arm attachable to a pilot's helmet; and
b) said first and second displays are carried by said arm.

13. An emergency vision apparatus for providing an aircraft pilot in a cockpit visual access to information during a smoke emergency, comprising:
a) a first camera for being operably associated with a cockpit windshield, said first camera being oriented to view objects outside the cockpit, said first camera including a first transmitter for transmitting video signals from said first camera;
b) a first display for displaying images generated by said first camera;
c) an enclosure made of airtight material having spaced apart front and rear panels, said front panel being transparent, said enclosure has an expanded form and a compact stowed form;
d) a second camera operably associated with said rear panel, said second camera being oriented to view an instrument panel through said transparent front panel, said second camera including a second transmitter for transmitting video signals from said second camera;
e) a second display for displaying images generated by said second camera;
f) a receiver for receiving video signals from said first and second cameras, said receiver being operably associated with said first and second displays;
g) said first and second displays are for being operably disposed in front of a pilot's eye; and
h) a filter operably associated with said enclosure to filter the ambient atmosphere and fill the interior of said enclosure with clear air when said enclosure is expanded to its expanded form.

14. An apparatus as in claim 13, and further comprising:
a) a suction cup for attaching to the windshield; and
b) said first camera is carried by said suction cup.

15. An apparatus as in claim 13, wherein said enclosure includes a flexible support biased to expand said enclosure to its expanded form and adapted to be collapsible when said enclosure is collapsed to its compact stowed form.

16. An apparatus as in claim 13, wherein said enclosure includes an inlet operably associated with said filter to allow ambient air to fill said enclosure when said enclosure is expanded to its expanded form.

17. An apparatus as in claim 13, wherein said enclosure is movable to selected parts of the instrument panel.

18. An apparatus as in claim 13, and further comprising:
a) support structure including an arm attachable to a pilot's helmet; and
b) said first and second displays are carried by said arm.

19. An electro-optical emergency vision apparatus for providing an aircraft pilot in a cockpit visual access to information during a smoke emergency, comprising:
a) a computer operably connected to an aircraft avionics systems for receiving flight data to be displayed;

b) an image processor for processing data from said computer suitable for display;
c) a first camera for being operably associated with a cockpit windshield, said first camera being oriented to view objects outside the cockpit, said first camera being operably connected to said image processor;
d) an enclosure made of airtight material having spaced apart front and rear panels, said front panel being transparent;
e) a second camera operably associated with said rear panel, said second camera being oriented to view the instrument panel through said transparent front panel, said second camera being operably attached to said image processor;
f) a display for being operably disposed in front of the pilot's eye for displaying data from said computer and said first and second cameras; and
g) said display is a virtual-reality goggles.

20. An emergency vision apparatus for providing an operator visual access to information during a smoke emergency, comprising:
a) an enclosure made of airtight material having spaced apart front and rear panels, said front panel being transparent, said enclosure is movable during the smoke emergency to selected parts of the instrument panel;
b) an image capture device operably associated with said rear panel, said image capture device being oriented to view the instrument panel through said transparent front panel;
c) an image viewing device for being disposed in front of one of the operator's eyes, said image viewing device being operably associated with said image capture device;
d) said image viewing device for being operably positioned in front of the operator's eye;
e) said enclosure has an expanded form and a compact stowed form; and
f) a filter operably associated with said enclosure to filter the ambient atmosphere and fill the interior of said enclosure with clear air when said enclosure is expanded to its expanded form.

21. An emergency vision apparatus as in claim 20, wherein:
a) said image capture device includes an objective lens;
b) said image viewing device includes a viewing lens; and
c) an optic fiber having one end operably associated with said objective lens and an opposite end being operably associated with said viewing lens for transmitting light from said objective lens to said viewing lens.

22. An emergency vision apparatus as in claim 20, wherein:
a) said image capture device includes a camera; and
b) said image viewing device includes a display operably associated with said camera.

23. An emergency vision apparatus as in claim 22, wherein said camera is wirelessly connected to said display.

24. An emergency vision apparatus as in claim 20, wherein said enclosure includes a flexible support biased to expand said enclosure to its expanded form and adapted to be collapsible when said enclosure is collapsed to its compact stowed form.

25. An emergency vision apparatus as in claim 24, wherein said flexible support includes a coil spring operably attached to a sidewall of said enclosure.

26. An emergency vision apparatus as in claim 20, wherein said enclosure includes an inlet operably associated with said filter to allow ambient air to fill said enclosure when said enclosure is expanded to its expanded form.

27. An emergency vision apparatus as in claim 20, wherein said enclosure includes fasteners for attachment to the instrument panel.

28. An emergency vision apparatus as in claim 20, and further comprising:
a) support structure including an arm attachable to an operator's helmet; and
b) said image viewing device is carried by said arm.

29. An emergency vision apparatus as in claim 20, wherein said image capture device is wirelessly connected to said image viewing device.

30. An apparatus as in claim 20, and further comprising:
a) a computer operably connected to an aircraft avionics system for receiving flight data to be displayed;
b) an image processor for processing data from said computer suitable for display; and
c) said image viewing device includes a display operably associated with said computer, said display for being operably disposed in front of the operator's eye for displaying data from said computer.

31. An emergency vision apparatus as in claim 30, wherein said display is a virtual-reality goggles.

* * * * *